(12) United States Patent
Ganiger et al.

(10) Patent No.: US 10,274,017 B2
(45) Date of Patent: Apr. 30, 2019

(54) METHOD AND SYSTEM FOR ELASTIC BEARING SUPPORT

(71) Applicant: General Electric Company, Schenectady, NY (US)

(72) Inventors: Ravindra Shankar Ganiger, Karnataka (IN); Shuvajyoti Ghosh, Karnataka (IN); Shivaram AC, Karnataka (IN); Akash Joshi, Karnataka (IN); Vidya Lokammanahalli Shivashankar, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/331,121

(22) Filed: Oct. 21, 2016

(65) Prior Publication Data

US 2018/0112672 A1    Apr. 26, 2018

(51) Int. Cl.
*F16C 19/06* (2006.01)
*F16C 25/08* (2006.01)
(Continued)

(52) U.S. Cl.
CPC ............ *F16C 39/02* (2013.01); *F01D 21/045* (2013.01); *F01D 25/162* (2013.01); *F01D 25/164* (2013.01); *F02K 3/06* (2013.01); *F04D 29/321* (2013.01); *F04D 29/662* (2013.01); *F16C 19/06* (2013.01); *F16C 19/225* (2013.01); *F16C 25/083* (2013.01); *F16C 35/073* (2013.01); *F02C 7/06* (2013.01); *F05D 2220/36* (2013.01);
(Continued)

(58) Field of Classification Search
CPC ...... F16C 19/06; F16C 19/225; F16C 25/083; F16C 27/06; F16C 33/583; F16C 35/073; F16C 39/02; F16C 2360/23; F16C 2202/06; F16C 2202/08; F05D 2240/54; F05D 2240/60; F02K 3/06; F04D 29/321; F01D 1/164; F01D 25/164
USPC ........ 384/495, 535–536, 581–582, 624, 563; 415/173.3, 174.3; 416/240, 500
See application file for complete search history.

(56) References Cited

U.S. PATENT DOCUMENTS 2,445,661 A *  7/1948  Constant ................. F01D 9/042
                                              415/115
4,451,110 A *  5/1984  Forestier ............... F01D 25/164
                                              384/582

(Continued)

FOREIGN PATENT DOCUMENTS

| CA | 2861292 A1 * | 6/2015 | ........... F01D 21/045 |
| EP | 3115551 A1 * | 1/2017 | ............ F16C 35/073 |
| WO | WO-2010001716 A1 * | 1/2010 | ............. F03G 7/065 |

*Primary Examiner* — Marcus Charles
(74) *Attorney, Agent, or Firm* — General Electric Company; Pamela A. Kachur

(57) ABSTRACT

A method of reducing loads in a rotor assembly during an imbalance condition, a shape memory alloy recoupler device, and a hybrid bearing support system are provided. The hybrid bearing support system includes a shaft extension fixedly coupled to a rotatable member at a radially inner end of the shaft extension, a radially outer end of the shaft extension fixedly coupled to a rotatable race of a bearing supporting the rotatable member, and a recoupler device formed of a shape memory alloy (SMA) material coupled in parallel with at least a portion of the shaft extension between the radially inner end and the radially outer end.

11 Claims, 8 Drawing Sheets

(51) Int. Cl.
  *F04D 29/056*  (2006.01)
  *F02K 3/06*    (2006.01)
  *F04D 29/32*   (2006.01)
  *F04D 29/053*  (2006.01)
  *F16C 35/073*  (2006.01)
  *F16C 39/02*   (2006.01)
  *F16C 19/22*   (2006.01)
  *F01D 25/16*   (2006.01)
  *F04D 29/66*   (2006.01)
  *F01D 21/04*   (2006.01)
  *F02C 7/06*    (2006.01)

(52) U.S. Cl.
  CPC .. *F05D 2260/311* (2013.01); *F05D 2300/505* (2013.01); *F16C 2202/06* (2013.01); *F16C 2202/08* (2013.01); *F16C 2360/23* (2013.01); *Y02T 50/671* (2013.01)

(56) References Cited

U.S. PATENT DOCUMENTS

| | | | |
|---|---|---|---|
| 5,088,840 A * | 2/1992 | Radtke | F01D 25/164 384/535 |
| 5,974,782 A * | 11/1999 | Gerez | F01D 21/045 415/9 |
| 6,009,701 A | 1/2000 | Freeman et al. | |
| 6,082,959 A | 7/2000 | Van Duyn | |
| 6,099,165 A | 8/2000 | Tremaine | |
| 6,240,719 B1 * | 6/2001 | Vondrell | F01D 21/04 60/223 |
| 6,491,497 B1 * | 12/2002 | Allmon | F01D 21/045 384/495 |
| 6,783,319 B2 * | 8/2004 | Doerflein | F01D 21/045 384/495 |
| 6,796,408 B2 | 9/2004 | Sherwin et al. | |
| 7,097,413 B2 | 8/2006 | VanDuyn | |
| 7,195,444 B2 | 3/2007 | Brault et al. | |
| 7,448,808 B2 * | 11/2008 | Bouchy | F01D 21/04 384/495 |
| 7,669,799 B2 * | 3/2010 | Elzey | B32B 3/28 244/123.12 |
| 7,832,193 B2 * | 11/2010 | Orlando | F01D 15/12 415/61 |
| 7,926,259 B2 * | 4/2011 | Orlando | F02C 7/36 60/204 |
| 8,100,638 B2 | 1/2012 | Udall | |
| 8,128,339 B2 * | 3/2012 | Kondo | F01D 25/164 384/535 |
| 8,136,999 B2 * | 3/2012 | Mons | F01D 21/045 384/581 |
| 8,167,531 B2 | 5/2012 | Mollmann et al. | |
| 8,246,255 B2 | 8/2012 | Raberin et al. | |
| 8,371,802 B2 | 2/2013 | Udall | |
| 8,403,634 B2 | 3/2013 | Arness et al. | |
| 8,430,622 B2 | 4/2013 | Webster et al. | |
| 8,662,756 B2 | 3/2014 | Care et al. | |
| 9,140,137 B2 | 9/2015 | Mayer et al. | |
| 2006/0269357 A1 | 11/2006 | Webb | |
| 2011/0150378 A1 | 6/2011 | Care et al. | |
| 2013/0324343 A1 | 12/2013 | Gallet | |
| 2018/0112554 A1 | 4/2018 | Ghosh et al. | |

* cited by examiner

METHOD AND SYSTEM FOR ELASTIC BEARING SUPPORT

BACKGROUND

The field of the disclosure relates generally to gas turbine engines and, more particularly, to load reduction assemblies for use in gas turbine engines.

Gas turbine engines typically include a rotor assembly, a compressor, and a turbine. The rotor assembly includes a fan that includes an array of fan blades extending radially outward from a fan hub coupled to a rotor shaft. The rotor shaft transfers power and rotary motion from the turbine to the compressor and the fan and is supported using a plurality of bearing assemblies spaced axially along the rotor shaft. Additionally, the rotor assembly has an axis of rotation that passes through a rotor assembly center of gravity. Known bearing assemblies include rolling elements and a paired race, wherein the rolling elements are supported within the paired race. The rotor assembly is typically supported on three bearing assemblies, one of which is a thrust bearing assembly and two which are roller bearing assemblies. The thrust bearing assembly supports the rotor shaft and supports axial and radial movement of the rotor shaft assembly. The remaining roller bearing assemblies support radial movement of the rotor shaft.

During operation of the engine, a fragment of a fan blade may become separated from the remainder of the blades and the rotor assembly. This is typically known as a fan bladeout or a blade-off (FBO) event. Accordingly, a substantial rotary unbalanced load may be induced within the rotor assembly that is carried substantially by the fan shaft bearings, the fan bearing supports, and the fan support frames.

To reduce the effects of imbalanced loads, at least some known engines include support components for the fan rotor support system that are sized to provide additional strength for the fan support system. However, increasing the strength of the support components also increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center of gravity. This fuse section, in combination with a rotor clearance allowance, is referred to as a load reduction device (LRD). The LRD reduces the rotating dynamic loads to the fan support system. After the primary fuse fails, the pitching fan rotor often induces a large moment to a next closest bearing. The next closest bearing is known as the number two bearing position. The moment induced to the number two bearing induces high bending and stress loads to the fan rotor locally. To relieve the high bending stresses, the radial and pitching rotation stiffness of the number two bearing position are often softened or released during the FBO.

After FBO, the fan is typically allowed to rotate, in a process called windmilling, such that drag induced by the engine is reduced. However, during windmilling the loads induced by rotor assembly and carried by the fan bearings are lower than during the FBO. As such, the LRD increases vibration within the engine during windmilling because stiffness of the number two bearing position is released.

BRIEF DESCRIPTION

In one aspect, a shape memory alloy recoupler device includes a radially inner flange comprising a circular cross-section, a radially outer flange comprising a circular cross-section, and a web member comprising an axial portion extending axially between the radially inner flange and the radially outer flange, the web member formed of a shape memory alloy (SMA) material.

In another aspect, a hybrid bearing support system includes a shaft extension fixedly coupled to a rotatable member at a radially inner end of the shaft extension, a radially outer end of the shaft extension fixedly coupled to a rotatable race of a bearing supporting the rotatable member, and a recoupler device formed of a shape memory alloy (SMA) material coupled in parallel with at least a portion of the shaft extension between the radially inner end and the radially outer end.

In yet another aspect, a method of reducing loads in a rotor assembly during an imbalance condition includes supporting the rotor assembly using a load reduction device, the load reduction device including: (i) a shaft extension extending between a bearing assembly and a shaft of the rotor assembly forming a load path therebetween, and (ii) an annular recoupler member extending between the bearing assembly and the shaft forming a second load path parallel to the first load path. The method also includes failing the shaft extension when a rotor assembly load through the load reduction device exceeds a predetermined range, and carrying the rotor assembly load through the load reduction device solely through the annular recoupler member.

DRAWINGS

These and other features, aspects, and advantages of the present disclosure will become better understood when the following detailed description is read with reference to the accompanying drawings in which like characters represent like parts throughout the drawings, wherein.

Figure 1:
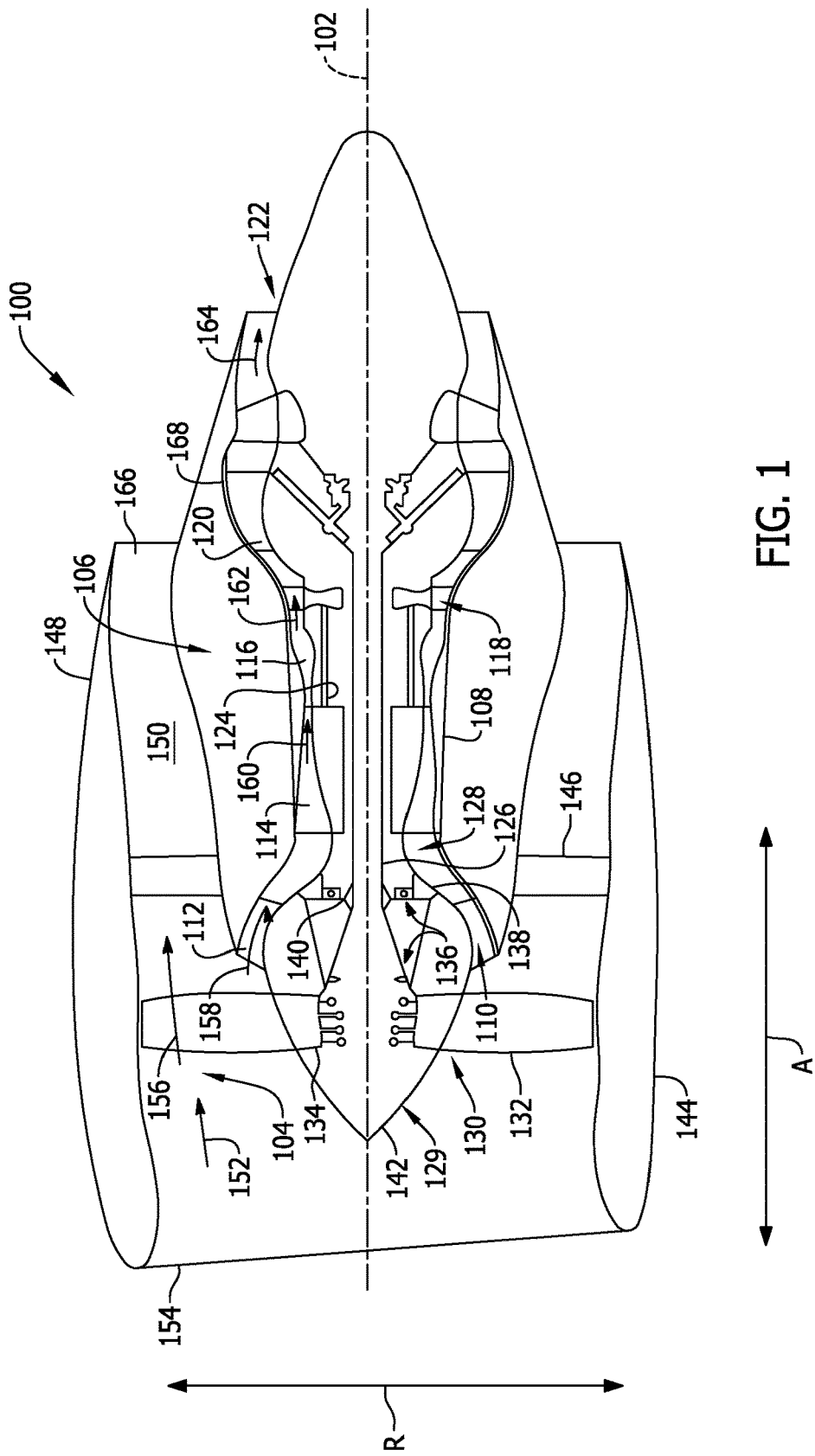
FIG. 1 is a schematic cross-sectional view of gas turbine engine in accordance with an exemplary embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the hybrid shape memory alloy (SMA)/ steel bearing supports and super elastic shaft extension systems described herein provide a cost-effective method for altering a vibration mode of a rotating component during operation. The embodiments described use design elements formed of Shape Memory Alloy (SMA) in the load path from, for example, in one embodiment, a fan shaft extension to an associated bearing. SMAs can display superelasticity, which is characterized by recovery of unusually large strains. A phase transformation between a martensite phase and an austenite phase can be induced in response to mechanical stress. When SMAs are loaded in the austenite phase, the material transforms to the martensite phase above a critical stress. Upon continued loading, the twinned martensite will begin to detwin, allowing the material to undergo large deformations. Once the stress is released, the martensite transforms back to austenite, and the material recovers its original shape. As a result, these materials can reversibly deform to very high strains approximately eight percent or more. The SMA component described herein exhibits superelastic effects, which offers low stiffness beyond the designed threshold load, leading to a drop in the fan mode and reduced loads during a fan bladeout (FBO) event. Under normal operating conditions and during windmill, because of lower bearing loads, support stiffness would be at the designed high value, assuring safe normal operation and reduced vibration during a windmill condition.

Loads generated from a fan bladeout event depend on the fan rotor natural frequency. For a load reduction device (LRD) system, bladeout induced structural decoupling of the fan assembly, which may be referred to as a fan decouple mode, the associated bearing load path stiffness governs the mode placement. A softer associated bearing stiffness drops the mode and hence lowers FBO loads. The associated bearing stiffness is also governed by post FBO event windmilling, which demands a stiffer associated bearing stiffness. Conflicting stiffness requirements of the FBO and windmilling events can be addressed by having a variable rotor stiffness arrangement. Shape memory alloys (SMAs) are smart materials that have the ability to recover their original shape/strains based on the applied load. SMAs have what is termed a "pseudo-elastic" or "super-elastic" property, which permits it to undergo large strains at a pre-set load limit and recover all the strain when the load is reduced. Strain levels of, for example, 6% to 10% can be achieved and can be recovered without material failure. For the load during an FBO event, the SMA material does not offer significant resistance to deformation at high loads, which leads to reduction in fan mode load that is controlled, hence less loads redirected to other parts of the engine. After crossing the fan mode, the SMA material will recover its original shape and begin offering reasonable stiffness. Windmilling mode margin can be maintained for the entire windmilling mission.

FBO loads are reduced and controlled by controlling the decouple mode placement using SMA components in the load path. Reducing the fan mode value reduces the fan displacement, rubs against the fan case, tip damage, and total unbalance. SMA components also offer hysteresis damping, which also reduces the load response.

Embodiments of a load reduction assembly for a turbofan engine as described herein provide an assembly that facilitates reducing a fan bladeout load and a subsequent windmilling load transferred from a bearing assembly to an engine frame. Specifically, in the exemplary embodiments, the load reduction assembly includes a shape memory alloy member that is responsive to a change in a stress condition so as to change stiffness thereof, thus regulating an imbalance condition of a rotor shaft coupled to the bearing assembly. As such, during a high stress condition of the fan bladeout, the load reduction assembly reduces stiffness such that the rotor shaft mode is reduced, and during a low stress condition of windmilling, the load reduction assembly regains its stiffness such that vibration loads are reduced. By forming the load reduction assembly from the shape memory alloy overall engine weight is reduced and fuel efficiency is increased.

FIG. 1 is a schematic cross-sectional view of gas turbine engine 100 in accordance with an exemplary embodiment of the present disclosure. In the exemplary embodiment, gas turbine engine 100 is embodied in a high-bypass turbofan jet engine, referred to herein as "turbofan engine." As shown in FIG. 1, turbofan engine 100 defines an axial direction A (extending parallel to a longitudinal centerline 102 provided for reference) and a radial direction R (extending perpendicular to longitudinal centerline 102). In general, turbofan engine 100 includes a fan case assembly 104 and a core engine 106 disposed downstream from fan assembly 104.

Core engine 106 includes an engine case 108 that defines an annular inlet 110. Engine case 108 at least partially surrounds, in serial flow relationship, a compressor section including a booster or low pressure (LP) compressor 112 and a high pressure (HP) compressor 114; an annular combustion section 116; a turbine section including a high pressure (HP) turbine 118 and a low pressure (LP) turbine 120; and a jet exhaust nozzle section 122. A high pressure (HP) shaft or spool 124 drivingly connects HP turbine 118 to HP compressor 114. A low pressure (LP) shaft or spool 126 drivingly connects LP turbine 120 to LP compressor 112. The compressor section, combustion section 116, turbine section, and nozzle section 122 together define an air flow path 128.

In the exemplary embodiment, fan assembly 129 includes a fan 130 having a plurality of fan blades 132 coupled to a disk 134 in a spaced apart manner. As depicted, fan blades 132 extend outwardly from disk 134 generally along radial direction R. Fan blades 132 and disk 134 are together rotatable about longitudinal centerline 102 by LP shaft 126. LP shaft 126 is supported at by a plurality of bearing assemblies, for example a number two bearing assembly 136 at a forward end of LP shaft 126. Bearing assembly 136 is coupled to an engine frame 138 and to LP shaft 126 through a hybrid bearing support system 140 that will be discussed in further detail below.

Referring still to the exemplary embodiment of FIG. 1, disk 134 is covered by a rotatable front hub 142 aerodynamically contoured to promote an airflow through plurality of fan blades 132. Additionally, fan assembly 104 includes an annular fan casing or outer nacelle 144 that circumferentially surrounds fan 130 and/or at least a portion of core engine 106. Nacelle 144 is supported relative to core engine 106 by a plurality of circumferentially-spaced outlet guide vanes 146. Moreover, a downstream section 148 of nacelle 144 may extend over an outer portion of core engine 106 so as to define a bypass airflow passage 150 therebetween.

During operation of turbofan engine 100, a volume of air 152 enters turbofan engine 100 through an associated inlet 154 of nacelle 144 and/or fan case assembly 104. As volume of air 152 passes across fan blades 132, a first portion 156 of air 152, known as fan stream air flow, is directed or routed into bypass airflow passage 150 and a second portion 158 of volume of air 152 is directed or routed into air flow path 128, or more specifically into booster compressor 112. A ratio between first portion 156 and second portion 158 is commonly referred to as a bypass ratio. The pressure of second portion 158 is then increased, forming compressed air 160, as it is routed through booster compressor 112 and HP compressor 114 and into combustion section 116, where it is mixed with fuel and burned to provide combustion gases 162.

Combustion gases 162 are routed through HP turbine 118 where a portion of thermal and/or kinetic energy from combustion gases 162 is extracted via sequential stages of HP turbine stator vanes (not shown) that are coupled to engine case 108 and HP turbine rotor blades (not shown) that are coupled to HP shaft or spool 124, thus causing HP shaft or spool 124 to rotate, which drives a rotation of HP compressor 114. Combustion gases 162 are then routed through LP turbine 120 where a second portion of thermal and kinetic energy is extracted from combustion gases 162 via sequential stages of LP turbine stator vanes (not shown) that are coupled to engine case 108 and LP turbine rotor blades (not shown) that are coupled to LP shaft or spool 126, which drives a rotation of LP shaft or spool 126 and booster compressor 112, and/or rotation of fan 130.

Combustion gases 162 are subsequently routed 164 through jet exhaust nozzle section 122 of core engine 106 to provide propulsive thrust. Simultaneously, the pressure of first portion 156 is substantially increased as first portion 156 is routed through bypass airflow passage 150 before it is exhausted from a fan nozzle exhaust section 166 of turbofan engine 100, also providing propulsive thrust. HP turbine 118, LP turbine 120, and jet exhaust nozzle section 122 at least partially define a hot gas path 168 for routing combustion gases 162 through core engine 106.

Turbofan engine 100 is depicted by way of example only, in other exemplary embodiments, turbofan engine 100 may have any other suitable configuration including for example, a turboprop engine, a military purpose engine, and a marine or land-based aero-derivative engine.

Figure 2:
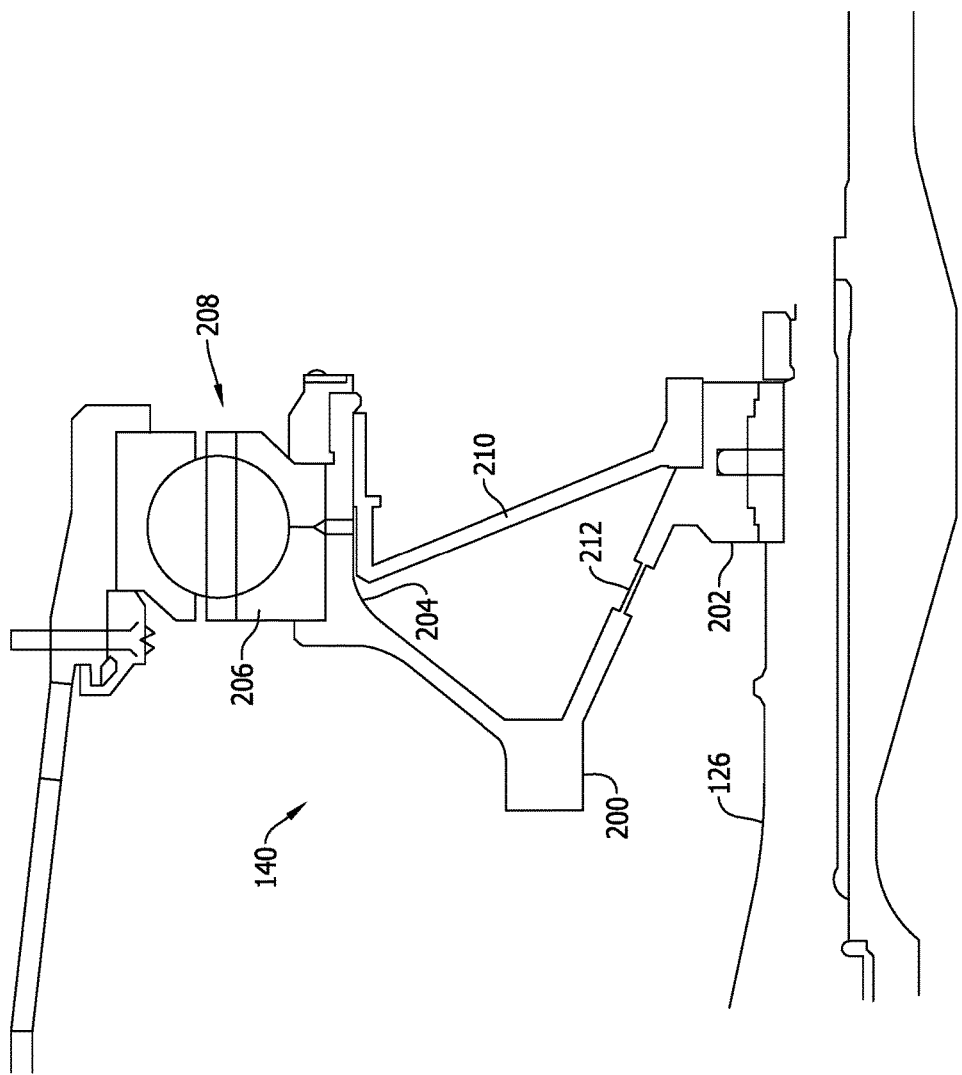
FIG. 2 is a side elevation view of hybrid bearing support system in accordance with the exemplary embodiment of the present disclosure.
Figure 3:
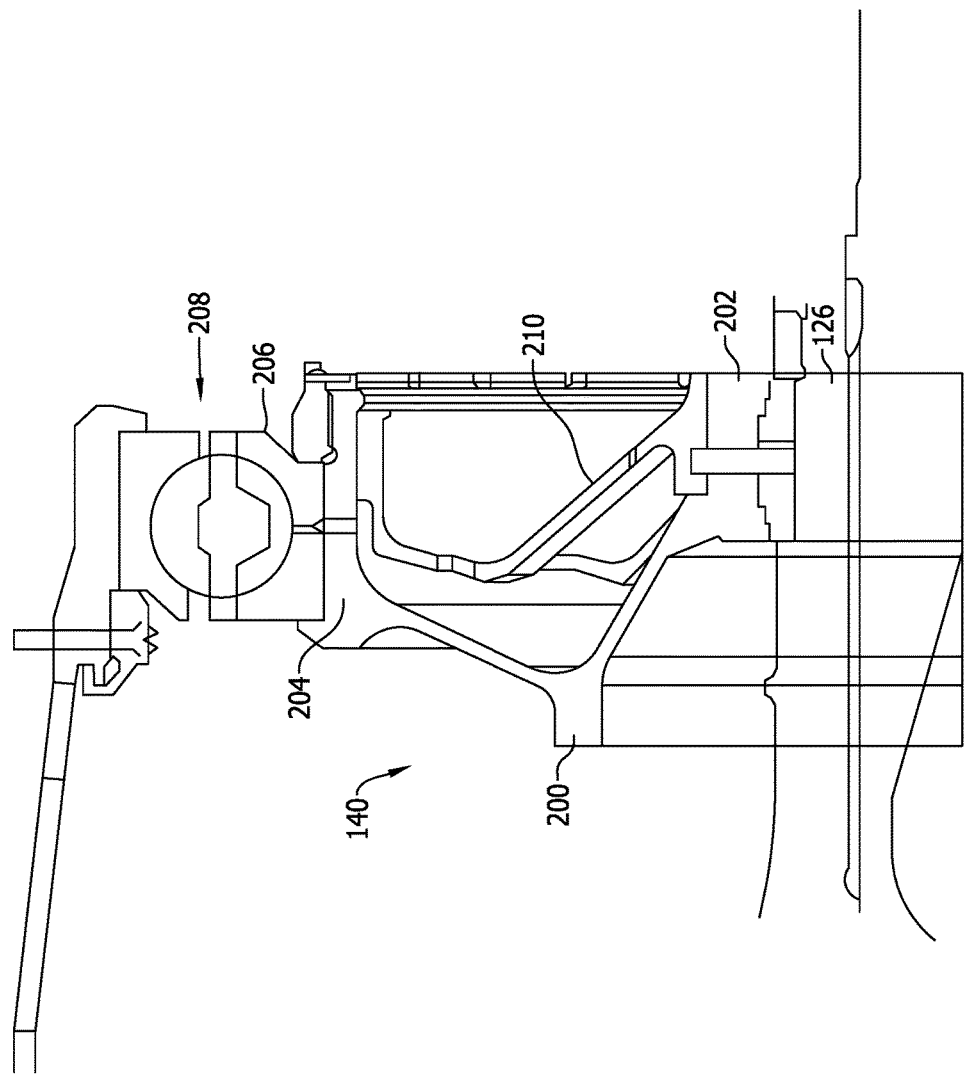
FIG. 3 is a side perspective view of the hybrid bearing support system (shown in FIG. 2).

FIG. 2 is a side elevation view of hybrid bearing support system 140 in accordance with an example embodiment of the present disclosure. FIG. 3 is a side perspective view of hybrid bearing support system 140. In various embodiments, hybrid bearing support system is configured to reduce imbalance loads during and after a fan bladeout event and includes a shaft extension 200 fixedly coupled to a rotatable member, such as but not limited to, LP shaft 126 at a radially inner end 202 of shaft extension 200. A radially outer end 204 of shaft extension 200 is fixedly coupled to a rotatable race 206 of a bearing 208 supporting LP shaft 126. A recoupler device 210 formed of a shape memory alloy (SMA) material is coupled in parallel with at least a portion of shaft extension 200 between radially inner end 202 and radially outer end 204. In one embodiment, a fuse portion 212 is formed in shaft extension 200 between radially inner end 202 and radially outer end 204. Fuse portion 212 is configured to fail or separate when a stress greater than a predetermined range is applied to hybrid bearing support system 140 and specifically to shaft extension 200. When fuse portion fails, all load carried by hybrid bearing support system 140 is transferred to recoupler device 210 so recoupler device 210 alone is carrying the load between LP shaft 126 and bearing 208.

The shape memory alloy (SMA) material configured and arranged to deform in an elastic, super-elastic, or pseudo-elastic manner above a threshold value of an activation characteristic such as, temperature, pressure, and/or mechanical loading. In addition, the SMA may be formed of a bimetal system wherein a plurality, such as, two different layers of SMA material are bonded together face-to-face. Each layer of SMA may have a different activation characteristic for returning to an original shape of, for example, conic web member 404. For example, the removal of stress or loading from conic web member 404 after it has been deformed may be facilitated by SMA layers bonded together face-to-face each having a different activation characteristic. Moreover, the differing activation characteristic levels and/or characteristics may facilitate moderating a return of recoupler device 210 from a deformed shape back to its original shape.

Figure 4:
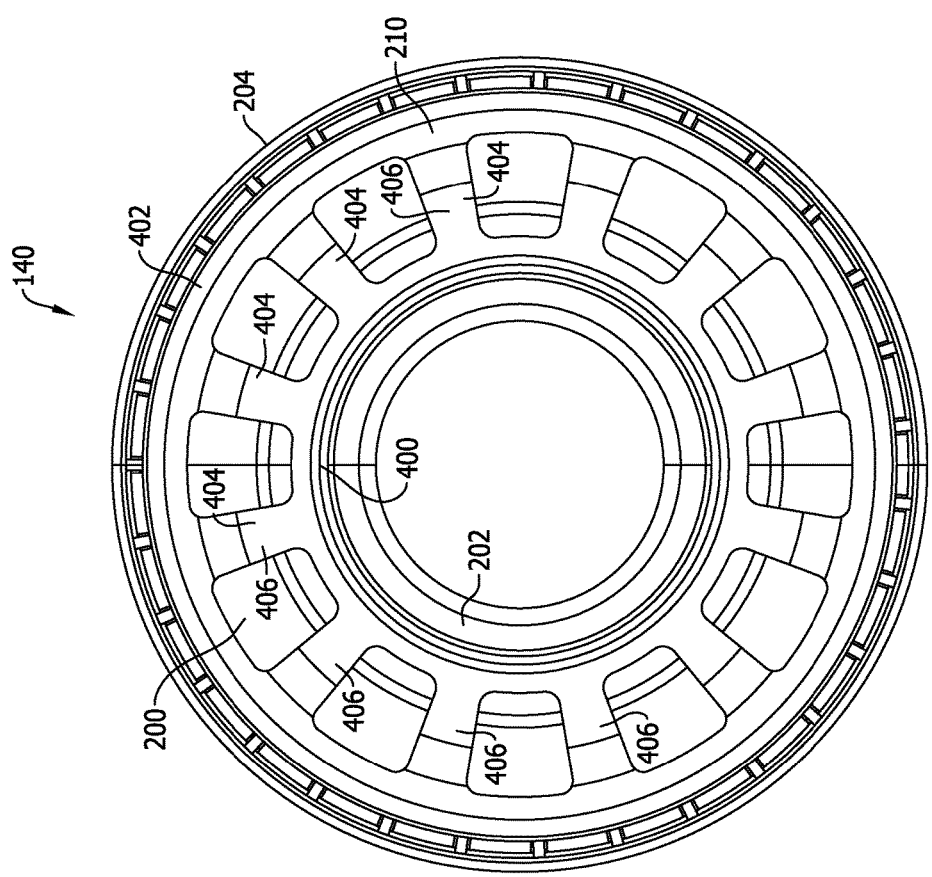
FIG. 4 is an axial view of the hybrid bearing support system (shown in FIG. 2).

FIG. 4 is an axial view of hybrid bearing support system 140. In the example embodiment, both shaft extension 200 and recoupler device 210 have conic cross-sections such that recoupler device 210 is able to fit at least partially within shaft extension 200. In other embodiments, shaft extension 200 and recoupler device 210 are axially offset such that recoupler device 210 is not surrounded by shaft extension 200. In the example embodiment, recoupler device 210 includes a radially inner flange 400, a radially outer flange 402, and a conic web member 404 extending therebetween. In various embodiments, each of radially inner flange 400 and radially outer flange 402 are formed of an alloy of steel, SMA material, or other metal or ceramic material. In embodiments where radially inner flange 400 and radially outer flange 402 are formed of SMA material, a radially inner flange 400, radially outer flange 402, and conic web member 404 may be formed together of SMA material as a monolithic structure, such as, by casting or additive manufacturing. In embodiments where radially inner flange 400, radially outer flange 402, and conic web member 404 are formed of different materials, radially inner flange 400, radially outer flange 402, and conic web member 404 may be joined together into a unitary structure, such as, by welding or other joining process. In some embodiments, conic web member 404 comprises a single skirt of SMA material extending 360° about a circumference of conic web member 404. In other embodiments, conic web member 404 comprises a plurality of spokes 406 of SMA material extending over a portion or sector of the circumference of conic web member 404. Each of the plurality of spokes 406 is spaced circumferentially from an adjacent spoke 406 a predetermined distance. Typically, spokes 406 are spaced evenly about conic web member 404.

Recoupler device 210 comprises an SMA that exhibits a first crystalline structure having a first stiffness when subjected to a first stress. The first stress may occur upon an FBO event where a highly loaded fan is spinning at high speed and losses at least a portion of one or more blades. The large imbalance in a severe FBO event can exceed a limit associated with a fuse on shaft extension 200. When this limit is exceeded, the fuse separates, shifting the entire load being carried by bearing support system 140 to recoupler device 210, subjecting it to a second stress. The SMA material in recoupler device 210 transitions to a second crystalline structure having a second stiffness when subjected to the second stress. In embodiments where recoupler device 210 is formed of layers of SMA, all layers may not deform in a given FBO event depending on the extent of the imbalance and the imbalance forces generated. Such a structure provides a wide variability of stiffness for bearing support system 140. In one embodiment, the SMA material in recoupler device 210 transitions between an austenite crystal structure and a martensite crystal structure. The stiffness of recoupler device 210 changes in the range of approximately 5.0M to approximately 3.6M during an FBO event. Other values of stiffness are achieved using different metallurgic combinations and a predetermined geometric sizing of recoupler device 210.

Figure 5:
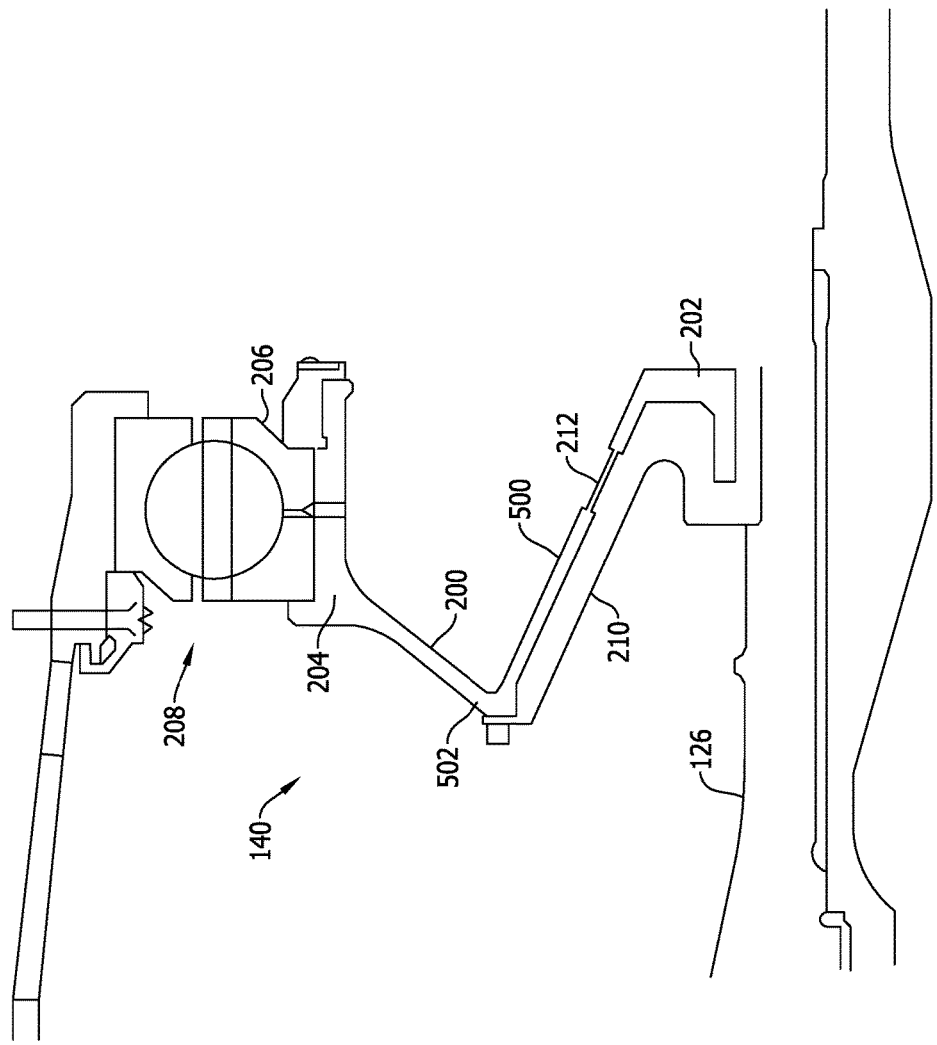
FIG. 5 is a side elevation view of the hybrid bearing support system (shown in FIG. 2) in accordance with another example embodiment of the present disclosure.
Figure 6:
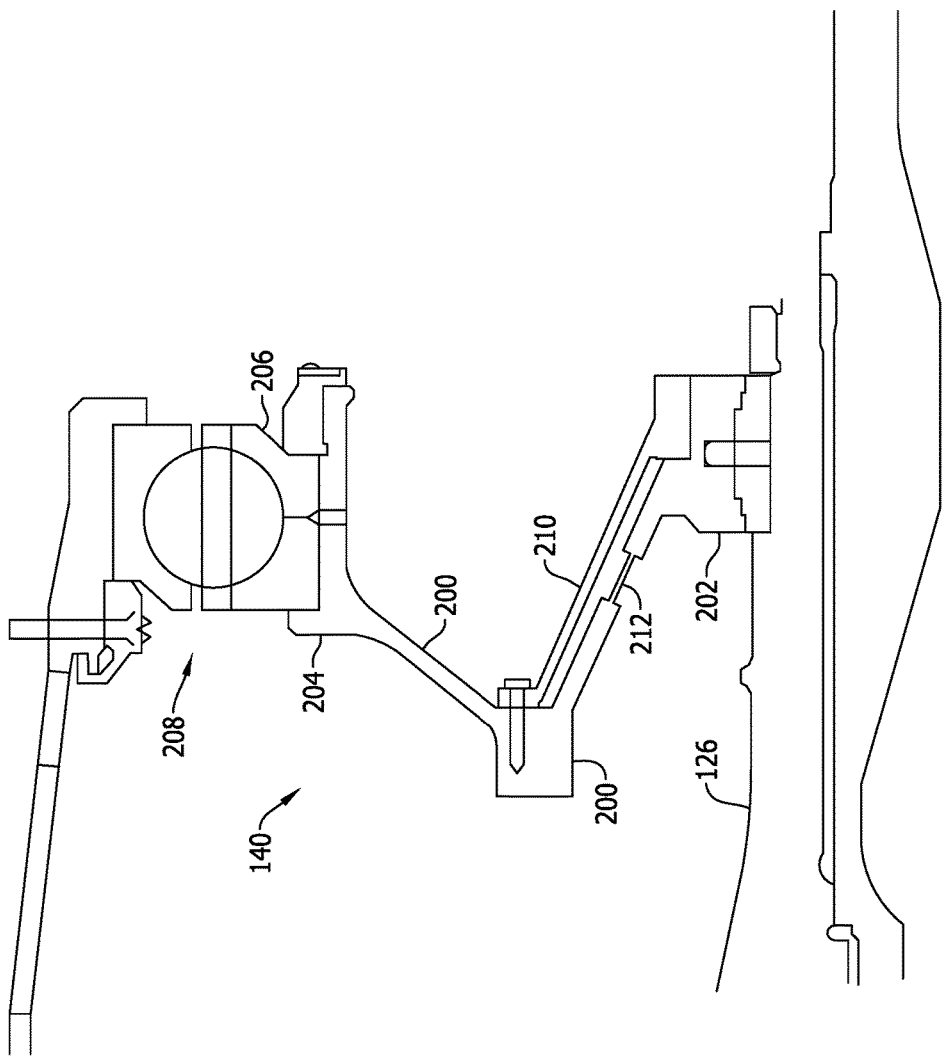
FIG. 6 is a side elevation view of the hybrid bearing support system (shown in FIG. 2) in accordance with still another example embodiment of the present disclosure.

FIG. 5 is a side elevation view of hybrid bearing support system 140 in accordance with another example embodiment of the present disclosure. FIG. 6 is a side elevation view of hybrid bearing support system 140 in accordance with still another example embodiment of the present disclosure. In the example embodiments, bearing support system 140 includes shaft extension 200 fixedly coupled to rotatable member 126 at radially inner end 202 of shaft extension 200. Radially outer end 204 of shaft extension 200 is fixedly coupled to a rotatable race 206 of bearing 208 supporting LP shaft 126. Recoupler device 210 formed of a shape memory alloy (SMA) material is coupled in parallel with a radially inner portion 500 of shaft extension 200 between radially inner end 202 and radially outer midspan 502. In the example embodiments, fuse portion 212 is formed in shaft extension 200 between radially inner end 202 and radially outer midspan 502. Fuse portion 212 is configured to fail or separate when a stress greater than a predetermined range is applied to hybrid bearing support system 140 and specifically to shaft extension 200. When fuse portion fails, all load carried by hybrid bearing support system 140 is transferred to recoupler device 210 so recoupler device 210 alone is carrying the load between LP shaft 126 and bearing 208.

The increased load on recoupler device 210 may be sufficient, in some cases, to exceed the activation characteristics of recoupler device 210, in which case, the crystal structure of recoupler device 210 responds to the stress, if above a predetermined threshold, by changing phase from a first phase to a second phase. In one embodiment, the first phase is, for example, a martensite phase and the second phase is, for example, an austenite phase.

Figure 7:
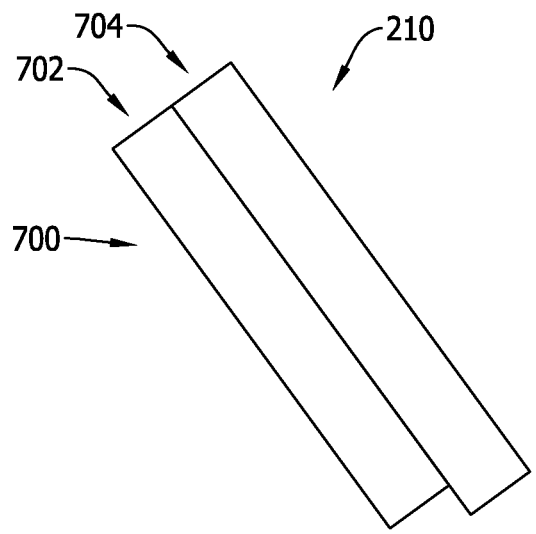
FIG. 7 is a side view of a portion of the recoupler device (shown in FIG. 2) illustrating a face-to-face bimetal configuration.
Figure 8:
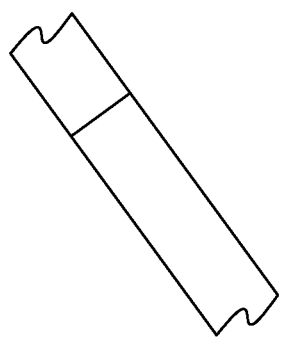
FIG. 8 is a side view of a portion of recoupler device (shown in FIG. 2) illustrating an end-to-end bimetal configuration.

FIG. 7 is a side view of a portion of recoupler device 210 illustrating a face-to-face bimetal configuration. FIG. 8 is a side view of a portion of recoupler device 210 illustrating an end-to-end bimetal configuration. In the example embodiments, the SMA may be formed of a bimetal system 700 wherein a plurality, such as, two different layers 702 and 704 of SMA material are bonded together face-to-face or end-to-end, respectively. Each layer 702, 704 of SMA may have a different activation characteristic for returning to an original shape of, for example, conic web member 404. For example, the removal of stress or loading from conic web member 404 after it has been deformed may be facilitated by SMA layers 702, 704 bonded together face-to-face or end-to-end, respectively, each having a different activation characteristic. Moreover, the differing activation characteristic levels and/or characteristics may facilitate moderating a return of recoupler device 210 from a deformed shape back to its original shape.

Figure 9:
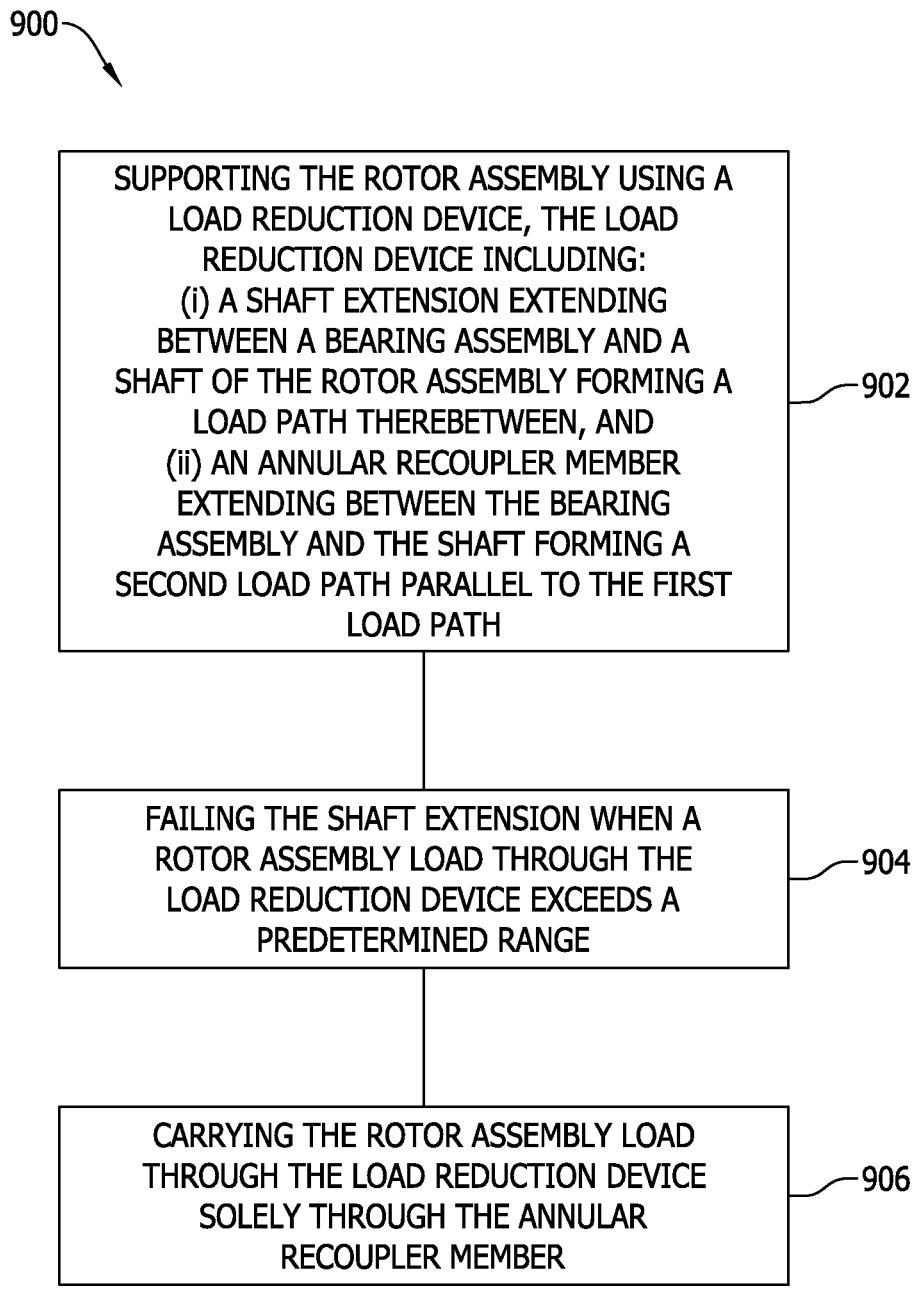
FIG. 9 is a flowchart of a method of reducing loads in a rotor assembly during an imbalance condition.

FIG. 9 is a flowchart of a method 900 of reducing loads in a rotor assembly during an imbalance condition. In the example embodiment, method 900 includes supporting 902 the rotor assembly using a load reduction device, the load reduction device including: (1) a shaft extension extending between a bearing assembly and a shaft of the rotor assembly forming a load path therebetween, and (2) an annular recoupler member extending between the bearing assembly and the shaft forming a second load path parallel to the first load path. Method 900 also comprises failing 904 the shaft extension when a rotor assembly load through the load reduction device exceeds a predetermined range and carrying 906 the rotor assembly load through the load reduction device solely through the annular recoupler member.

The above-described hybrid bearing support system including at least a shaft extension and a recoupler device formed of a shape memory alloy (SMA) material provides an efficient method for a variable stiffness bearing support system. The variable stiffness bearing support system can absorb large imbalance loads during a fan bladeout event and then recover stiffness in the bearing support system using the SMA recoupler device for a subsequent windmilling mode of operation. Specifically, the above-described shaft extension includes a fuse portion that is configured to fail upon the application of large imbalance loads to the variable stiffness bearing support system. When the fuse portion fails, the shaft extension can no longer carry any load and all imbalance loads transfer to the SMA recoupler device, which changes state to a less stiff structure, allowing the rotor assembly to achieve a new axis of rotation for a subsequent windmilling mode of operation. As the imbalance loads diminish, the SMA recoupler device, changes state back to a more stiff structure for supporting the rotor assembly during the windmilling mode of operation. As a result, the methods and systems described herein facilitate accommodating the different stiffness requirements needed during first a fan bladeout event and then the subsequent windmilling mode of operation using the variable stiffness bearing support system, which can absorb large imbalance loads during the fan bladeout event and then recover stiffness in the bearing support system using the SMA recoupler device for the windmilling mode of operation in a cost-effective and reliable manner.

As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover, additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hybrid bearing support system for a rotatable member, said system comprising:
    a shaft extension fixedly coupled to the rotatable member at a radially inner end of the shaft extension, a radially outer end of said shaft extension fixedly coupled to a rotatable race of a bearing supporting the rotatable member; and
    a recoupler device formed of a shape memory alloy (SMA) material coupled in parallel with at least a portion of said shaft extension between the radially inner end and the radially outer end; and
    wherein said recoupler device comprises a first crystalline structure having a first stiffness when subjected to a first stress, said recoupler device comprises a second crystalline structure having a second stiffness when subjected to a second stress.

2. The hybrid bearing support system of claim 1, wherein said shaft extension comprises a conic cross section.

3. The hybrid bearing support system of claim 1, wherein said recoupler device comprises a conic cross section.

4. The hybrid bearing support system of claim 1, wherein said recoupler device comprises a radially inner flange, a radially outer flange, and a conic web member extending therebetween.

5. The hybrid bearing support system of claim 1, wherein said conic web member comprises a single skirt of SMA material.

6. The hybrid bearing support system of claim 4, wherein said conic web member comprises a plurality of spokes of SMA material.

7. The hybrid bearing support system of claim 4, wherein at least one of said radially inner flange and said radially outer flange comprise at least one of an SMA material and a steel material.

8. A method of reducing loads in a rotor assembly during an imbalance condition, said method comprising:
    supporting the rotor assembly using a load reduction device, the load reduction device including: (i) a shaft extension extending between a bearing assembly and a shaft of the rotor assembly forming a load path therebetween, and (ii) an annular recoupler member extending between the bearing assembly and the shaft forming a second load path parallel to the first load path;
    failing the shaft extension when a rotor assembly load through the load reduction device exceeds a predetermined range;
    carrying the rotor assembly load through the load reduction device solely through the annular recoupler member; and
    wherein the shaft extension includes a first portion coupled to the bearing assembly, a second portion coupled to the shaft of the rotor assembly, and a fusible member positioned between the first portion and the second portion, and wherein failing the shaft extension comprises failing the fusible member of the shaft extension to disconnect the first portion from the second portion during a fan bladeout event.

9. The method of claim 8, wherein the recoupler member is formed of a shape memory alloy such that the recoupler member is responsive to a change in a stress condition of the load reduction device and configured to change stiffness thereof, thereby regulating an imbalance condition of the shaft of the rotor assembly.

10. The method of claim 8, wherein carrying the rotor assembly load through the load reduction device solely through the annular recoupler member comprises carrying the rotor assembly load through the load reduction device solely through the annular recoupler member during a post-fan bladeout event windmilling mode of operation.

11. A method of reducing loads in a rotor assembly during an imbalance condition, said method comprising:
    supporting the rotor assembly using a load reduction device, the load reduction device including: (i) a shaft extension extending between a bearing assembly and a shaft of the rotor assembly forming a load path therebetween, and (ii) an annular recoupler member extending between the bearing assembly and the shaft forming a second load path parallel to the first load path;
    failing the shaft extension when a rotor assembly load through the load reduction device exceeds a predetermined range;
    carrying the rotor assembly load through the load reduction device solely through the annular recoupler member; and
    wherein supporting the rotor assembly comprises supporting the rotor assembly using both the shaft extension and the recoupler member while a crystal structure of the recoupler member is in a first structure, and wherein failing the shaft extension comprises transitioning the crystal structure of the recoupler member to a second structure.

* * * * *